3,210,311
TURPYL ALCOHOL AND DICARBOXYLIC ACID ESTER PLASTICIZERS THEREOF
George L. Brownell, Pittsburgh, Pa., and Melvern C. Hoff, Highland, Ind., assignors to Oxo Chemical Company, Haverhill, Ohio, a corporation of North Carolina
No Drawing. Filed July 31, 1963, Ser. No. 299,097
17 Claims. (Cl. 260—29.8)

This invention relates to the plasticization of halogen containing resins and more specifically vinyl chloride resins.

It is an object of the present invention to prepare novel plasticized vinyl chloride resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by plasticizing vinyl chloride resins with esters of turpyl alcohol and a dibasic acid.

Turpyl alcohol is the alcohol obtained by the oxoation of a turpentine, such as wood and gum, followed by hydrogenation. It is essentially a mixture of

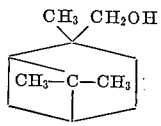

a neoalcohol, with smaller amounts of three isomeric pinane methyl alcohols having the formulae

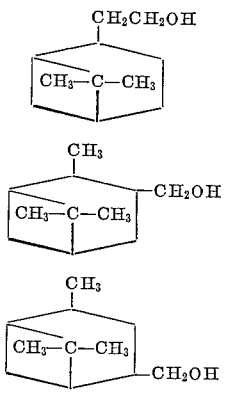

Thus turpyl alcohol is a mixture of bicyclic alcohols having the empirical formula $C_{11}H_{20}O$.

It can be prepared for example by oxoation of 3350 ml. of wood turpentine at 320° F. and 400 p.s.i. with a 1 to 1 carbon monoxide-hydrogen gas mixture in the presence of 1% dicobalt octacarbonyl based on the weight of the turpentine. The oxo product obtained was then hydrogenated at 400° F. and 1800 p.s.i. in the presence of 11% of nickel catalyst by weight of the charge to produce the turpyl alcohol.

As plasticizers there can be used diturpyl phthalate, diturpyl maleate, diturpyl adipate, diturpyl sebacate, diturpyl fumarate, diturpyl azeleate, diturpyl terephthalate, diturpyl isophthalate, mixed turpyl alkyl esters, e.g. turpyl methyl phthalate, turpyl butyl phthalate, turpyl isohexyl phthalate, turpyl isooctyl phthalate, turpyl isodecyl phthalate, turpyl tridecyl phthalate, turpyl n-decyl phthalate, turpyl 2-ethylhexyl phthalate, turpyl butyl maleate, turpyl isooctyl maleate, turpyl isohexyl fumarate, turpyl butyl sebacate, turpyl isodecyl sebacate, turpyl butyl adipate, turpyl 2-ethylhexyl adipate, turpyl isodecyl maleate, turpyl nonyl azeleate.

As the vinyl chloride resin there can be used polyvinyl chloride or copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other dialkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, alpha chloroacrylate, styrene, trichloroethylene, vinyl ethers such as vinyl ethyl ether, vinyl choroethyl ether and vinyl phenylether, vinyl ketones such as vinyl methyl ketone and vinyl phenyl ketone, 1-fluro-1-chloroethylene, acrylonitrile, chloroacrylonitrile, allylidene diacetate and chloroallylidene diacetate. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumurate (95:5), vinyl chloride-trichloroethylene (95:5), vinyl chloride-2-ethylhexyl acrylate (80:20), vinyl chloride-acrylonitrile (80:20).

The plasticizer can be used in an amount of 10 to 200 parts per 100 parts of vinyl chloride resin and is usually used in an amount of 30 to 150 parts per 100 parts of the resin.

The turpyl ester can be the sole plasticizer or it can be used in conjunction with conventional vinyl chloride resin plasticizers such as dioctyl phthalate, dibutyl sebacate, diisodecyl phthalate, dioctyl sebacate, etc.

The turpyl esters of the present invention, e.g. turpyl butyl phthalate, can be blended with vinyl chloride resin containing clay, calcium carbonate, asbestos or other fillers. This is valuable in the manufacture of floor tiles. The plasticizers of the present invention are also useful in other vinyl resin formulations, e.g. films and rigids.

Any of the conventional stabilizers can be added to the composition, e.g. barium laurate, cadmium laurate, barium octoate, triphenyl phosphite, dioctyl phenyl phosphite, decyl diphenyl phosphite, dibutyltin dilaurate.

Unless otherwise indicated all parts and percentages are by weight.

EXAMPLE 1

*Turpyl butyl phthalate*

There were charged into a reactor 3.3 moles of phthalic anhydride, 3.46 moles of turpyl alcohol (3.5% excess), 3.46 moles of butyl alcohol (3.5% excess), 4.7 grams of p-toluene sulfonic acid (catalyst) and 2.7 grams of Nuchar finely divided carbon (to remove color formers). The mixture was heated at 145–170° C. for 6 hours and 25 minutes. During the heating an additional 0.231 mole of butyl alcohol was gradually added.

The yield of turpyl butyl phthalate was 99.8%. The product was neutralized with 7.9 grams of sodium carbonate at 90° C. for 30 minutes, filtered and washed with 2.0% aqueous sodium hydroxide at 95° C. followed by washing with water at 95° C.

EXAMPLE 2

*Diturpyl phthalate*

There were charged into the reactor 3.0 moles of phthalic anhydride, 6.42 moles of turpyl alcohol (7% excess), 5.41 grams p-toluene sulfonic acid (0.35% based on the total change), and 8.00 grams of Nuchar 0.5% based on the total charge. The mixture was heated at 150–170° C. for 4 hours and 10 minutes. The yield of diturpyl phthalate was 99.4%. The product was neutralized with sodium carbonate and water washed as in Example 1.

The other diturpyl esters and turpyl alkyl esters of dicarboxylic acids can be prepared in the manner just described. When a turpyl alkyl ester is prepared wherein the alkyl group is the residue of a volatile alkanol, e.g. methyl alcohol to butyl alcohol, it is desirable to add a small amount of the alcohol during the esterification to replace that lost by volatilization.

The properties of some of the turpyl esters employed in the following examples are given in Table 1, below.

TABLE 1

| Ester | Sp. Gr., 25/25° C. | Viscosity, 25° C., cp. | $n_D^{25}$ |
|---|---|---|---|
| Diturpyl phthalate | 1.068 | 28,100 | 1.5221 |
| Butyl turpyl phthalate | 1.061 | 609 | 1.5130 |
| Isohexyl turpyl phthalate | 1.047 | 914 | 1.5114 |
| Isooctyl turpyl phthalate | 1.036 | 1,016 | 1.5091 |

In the formulae in the following examples Geon 101 is polyvinyl chloride, Mark XI is barium-cadmium laurate, and Mark XX is a commercial triaryl phosphite stabilizer where the aryl groups are of the benzene series.

In the following examples the compositions were processed on a mill at 280–285° F.

EXAMPLE 3

| Formulation | Butyl Turpyl Phthalate | Butyl Turpyl Phthalate | Butyl Turpyl Phthalate | Diturpyl Maleate | Santicizer 160 | Dioctyl Phthalate |
|---|---|---|---|---|---|---|
| Geon 101 | 100 | 100 | 100 | 100 | 100 | 100 |
| Ester | 54 | 60 | 66 | 54 | 54 | 54 |
| Mark XI | 2 | 2 | 2 | 2 | 2 | 2 |
| Mark XX | 1 | 1 | 1 | 1 | 1 | 1 |
| Mechanical Properties: | | | | | | |
| Tensile, p.s.i. | 3,590 | 3,510 | 3,410 | 3,700 | 3,675 | 3,170 |
| Ultimate Elong., percent | 280 | 290 | 300 | 255 | 300 | 325 |
| Modulus (100%), p.s.i. | 3,000 | 2,700 | 2,275 | 3,465 | 1,885 | 1,840 |
| Shore A Hardness (10 sec.) | 97 | 92 | 86 | ~103 | 84 | 87 |
| Clash-Berg, $T_f$, ° C. | +7 | +2 | −2 | +9 | −14 | −27 |
| A.C. Volatility (24 hrs. at 90° C.), percent Loss | 3.5 | 4.2 | 4.9 | 1.6 | 7.9 | 4.4 |

EXAMPLE 4

100 parts Geon 101, 54 parts of diturpyl phthalate, 2 parts Mark XI and 1 part Mark XX were milled at 280–258° F. The banding time was 80 seconds which was twice the banding time when the diturpyl phthalate was replaced by butyl turpyl phthalate.

EXAMPLE 5

| Formulation | Turpyl Isooctyl Phthalate | Turpyl Isohexyl Phthalate | Santicizer 160 (Butyl benzyl phthalate) |
|---|---|---|---|
| Geon 101 | 100 | 100 | 100 |
| Ester | 54 | 54 | 54 |
| Mark XI | 2 | 2 | 2 |
| Mark XX | 1 | 1 | 1 |
| Tensile, p.s.i. | 3,495 | 3,795 | 3,870 |
| Ultimate Elong., Percent | 220 | 250 | 330 |
| Modulus, 100% | 3,210 | 3,300 | 1,990 |
| Shore A Hardness, 10 sec. | 100 | 100 | 84 |
| Clash Berg, $T_f$, ° C. | 6.4 | 8.7 | −14 |
| C.A. Volatility, 90° C., 24 hrs | 1.1 | 1.6 | 8.6 |
| Oil Extraction, Percent | 0.0 | 0.0 | 1.0 |

We claim:

1. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a member of the group consisting of diturpyl esters of dicarboxylic acids and turpyl alkyl esters of dicarboxylic acids, said dicarboxylic acid being selected from the group consisting of benzene dicarboxylic acid, an alkanedioic acid containing 6 to 10 carbon atoms and an alkenedioic acid containing 4 carbon atoms.

2. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a diturpyl ester of a dicarboxylic acid, said dicarboxylic acid being selected from the group consisting of benzene dicarboxylic acid, an alkanedioic acid containing 6 to 10 carbon atoms and an alkenedoic acid containing 4 carbon atoms.

3. A composition according to claim 2 wherein the diturpyl ester is a diturpyl benzene dicarboxylate.

4. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor diturpyl phthalate.

5. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a diturpyl ester of an alkanedioic acid containing 6 to 10 carbon atoms.

6. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a diturpyl ester of an alkanedioic acid containing 4 carbon atoms.

7. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor diturpyl maleate.

8. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a turpyl alkyl ester of a benzene dicarboxylic acid, said alkyl containing up to 10 carbon atoms.

9. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor turpyl alkyl phthalate, said alkyl containing up to 10 carbon atoms.

10. A composition according to claim 9 wherein the alkyl group has 4 to 10 carbon atoms.

11. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor turpyl butyl phthalate.

12. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor turpyl isohexyl phthalate.

13. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor turpyl isooctyl phthalate.

14. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a turpyl alkyl ester of an alkanedioic acid containing 6 to 10 carbon atoms, said alkyl containing up to 10 carbon atoms.

15. A composition according to claim 14 wherein the alkyl group has 4 to 10 carbon atoms.

16. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a turpyl alkyl ester of an alkanedioic acid having 4 carbon atoms, said alkyl containing up to 10 carbon atoms.

17. A vinyl chloride resinous composition comprising a vinyl chloride resin selected from the group consisting of homopolymers of vinyl chloride and copolymers of vinyl chloride with from 1 to 90% of an ethylenically unsaturated monomer copolymerizable therewith and as a plasticizer therefor a turpyl alkyl maleate having 4 to 10 carbon atoms in the alkyl group.

References Cited by the Examiner

UNITED STATES PATENTS

| | | | |
|---|---|---|---|
| 2,011,707 | 8/35 | Borglin | 260—475 |
| 2,862,959 | 12/58 | Patrick et al. | 260—31.8 |

OTHER REFERENCES

Penn: PVC Technology: MacClaren & Sons Ltd.; 1962, page 48; Sci. Lib. TP 986 V48P4.

MORRIS LIEBMAN, *Primary Examiner.*